United States Patent [19]

Lee

[11] Patent Number: 5,680,123
[45] Date of Patent: Oct. 21, 1997

[54] VEHICLE MONITORING SYSTEM

[76] Inventor: Gul Nam Lee, 15428 Wilder Ave., Norwalk, Calif. 90650

[21] Appl. No.: 692,593

[22] Filed: Aug. 6, 1996

[51] Int. Cl.$^6$ .................................................. G08G 1/017
[52] U.S. Cl. ...................... 340/937; 340/435; 340/903; 348/148
[58] Field of Search ..................... 340/937, 426, 340/435, 436, 903; 348/148, 149

[56] References Cited

U.S. PATENT DOCUMENTS

| | | | |
|---|---|---|---|
| 4,260,980 | 4/1981 | Bates | 340/32 |
| 4,694,295 | 9/1987 | Miller et al. | 340/903 |
| 5,027,104 | 6/1991 | Reid | 340/426 |
| 5,280,555 | 1/1994 | Ainsburg | 385/116 |
| 5,307,136 | 4/1994 | Saneyoshi | 356/1 |
| 5,355,118 | 10/1994 | Fukuhara | 340/435 |
| 5,424,952 | 6/1995 | Asayama | 364/443 |
| 5,430,431 | 7/1995 | Nelson | 340/434 |
| 5,530,421 | 6/1996 | Marshall et al. | 340/435 |
| 5,570,127 | 10/1996 | Schmidt | 348/148 |

*Primary Examiner*—Jeffery Hofsass
*Assistant Examiner*—Anh La

[57] ABSTRACT

The vehicle monitoring system uses a plurality of video cameras mounted on various location of a vehicle to detect and display objects not readily visible to the vehicle operator. In particular, video cameras are placed on each side of the vehicle and, preferably, on the rear portion of the vehicle. Each camera is connected to a display unit and/or a video recorder through a video multiplexer which is controlled by a main controller. The views from different cameras are displayed or recorded in response to the position of a turn signal control switch. Alternatively, the cameras can be activated when a vehicle alarm is triggered or when the vehicle is hit from the behind.

8 Claims, 5 Drawing Sheets

VEHICLE MONITORING SYSTEM

BACKGROUND OF THE INVENTION

1. Field of the Invention

This invention relates to a vehicle monitoring system for displaying views from cameras mounted on various locations of a vehicle on a display device to detect objects not readily visible to a vehicle operator.

2. Description of Related Art

In modern traffic conditions, driving a motor vehicle poses the ultimately dangerous task of watching oncoming road hazards while at the same time looking backwards. Besides paying attention to various control gauges and switches in the vehicle, the driver must be aware of all oncoming road hazards and traffic control devices, including stopped cars and traffic signals. It is also necessary to look both sideways and backwards before safely changing lanes on a highway. A failure to properly look both sideways and backwards before changing lanes can lead to serious accidents which can cause property damages and even serious bodily harm or death.

Conventionally, rearview mirrors located both inside the front windshield and on the sides of vehicles so far have been the only widely accepted means for observing vehicles on the sides or behind the driver's vehicle. All such rear view and side mirrors leave at least one blind spot where the driver cannot detect a nearby vehicle. Thus, the driver must physically turn his or her head to detect such vehicles hidden in the blind spots. These blind spots generally exist right next to the rear fenders of a car or next to the rear wheels of a truck. Sometimes an entire car or motorcycle can be driving right alongside the driver's car totally undetected by the driver even after checking his rear view mirrors.

To alleviate the above problem, some newer automobiles and trucks are equipped with side view mirrors which use convex mirrors to detect vehicles in blind spots. One problem with these mirrors is that the true distance between the vehicles cannot be reasonably determined due to the optical characteristics of such mirrors.

With regard to a theft deterrence means for vehicles, the most commonly used method currently available is use of vehicle alarms which are triggered to fend off vehicle intruders. Such vehicle alarms are not equipped with a video camera and recording system to capture the image of the intruder, who is trying to break into the vehicle, to assist the law enforcement officers to later apprehend the suspect.

SUMMARY OF THE DISCLOSURE

It is an object of the present invention to provide a video camera and display system to detect vehicles in the blind spot alongside a driver's vehicle in response to a turn signal control. Further object of the present invention is to provide a recording device to record the views from cameras mounted on various locations of the vehicle to memorialize the events that take place around the vehicle.

According to a first embodiment of the present invention, the vehicle monitoring system for use with a vehicle for detecting the presence of an object moving relative and adjacent to the vehicle includes a first video camera mounted on a right side of the vehicle to view an object present in the right region of the vehicle, a second video camera mounted on a left side of the vehicle to view an object present in the left region of the vehicle, and a third video camera mounted on a rear the vehicle to view an object present in the rear region of the vehicle. A turn signal control switch of the vehicle is used for selecting for display at least one of the camera view of the surrounding regions of the vehicle. The camera view from the first video camera is selected when the turn signal control switch is enabled to represent a right turn. The camera view from the second video camera is selected when the turn signal switch is enabled to represent a left turn. The camera view from the third video camera is selected when the turn signal control switch is at a neutral position. The vehicle monitoring system also has a display apparatus for displaying the display selected by the turn signal control switch.

The vehicle monitoring system further includes a controller which is responsive to the turn signal control switch for selecting a video signal to be displayed on the display apparatus, and an activation device coupled to the controller. Moreover, the vehicle monitoring system may have a video multiplexer responsive to a control signal generated from the controller. Preferably, the video multiplexer is coupled to the first, the second and the third video cameras to provide the video signal to the display apparatus. In addition, the vehicle monitoring system may also have a video recording device coupled to the video multiplexer for recording the video signals received from the video cameras.

In accordance with the embodiment of the present invention, the activation device of the vehicle monitoring system includes a theft deterrent system, such as a vehicle alarm, equipped with a protection circuit, which activates the controller when the protection circuit is disrupted. In such a case, the controller controls the video multiplexer to provide the video signal from each one of the video cameras to at least one of the video recording device and the display apparatus in a sequential manner for a predetermined period.

The activation device may also include an impact sensor mounted on a rear bumper of the vehicle which activates the controller when the object collides with the vehicle. Similar to the above, the controller controls the video multiplexer to provide the video signal from each one of the video cameras to at least one of the video recording device and the display apparatus in a sequential manner for a predetermined period. Another type of the activation device includes a brake sensor which activates the controller when the vehicle makes a sudden stop.

These and other aspects, features and advantages of the present invention will be better understood by studying the detailed description in conjunction with the drawings and the accompanying claims.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

Figure 1A:
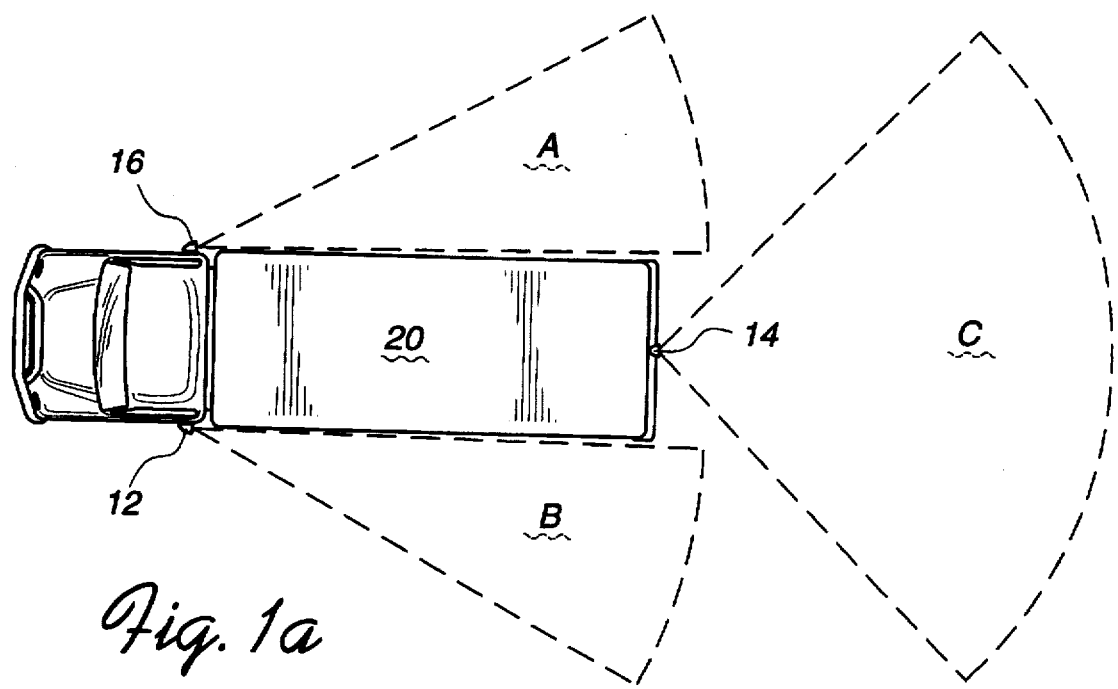
FIG. 1A is a top plan view of a vehicle monitoring system installed on a truck according to an embodiment of the present invention.

A vehicle monitoring system for viewing objects around the vehicle according to an embodiment of the invention is shown in the drawings for purposes of illustration. The vehicle monitoring system is a full function wired system designed to be used with any type of vehicles, including, without limitations, trucks and sedans. A preferred embodiment of the remote control device has a full color display for displaying objects, such as automobiles, around the vehicle equipped with the vehicle monitoring system. The vehicle monitoring system also has the ability to be activated even when an automobile theft alarm is triggered. In such a case, instead of displaying what was being monitored on a display unit, the video signal is, for example, recorded into an onboard video recorder. The vehicle monitoring system preferably has a main control unit with a display device, three cameras installed on various locations of the vehicle, and sensors for activating the main control unit so that the cameras and the display are turned on.

Figure 1B:
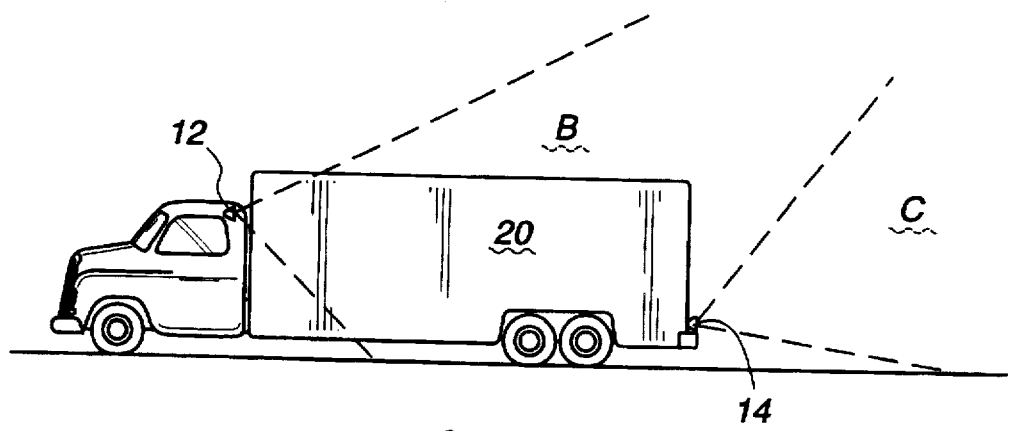
FIG. 1B is a side view of the vehicle monitoring system installed on a truck.

FIGS. 1A–1B illustrate a vehicle monitoring system installed on a truck 20 according to an embodiment of the present invention. More specifically, FIG. 1A shows three video cameras 12, 14 and 16 installed on the truck 20. The video camera 12 is preferably installed on the left side of the truck 20 to detect objects in the left region B, whereas the video camera 16 is preferably installed on the right side of the truck 20 to detect objects in the right region A. The video camera 14 is preferably installed on the rear of the truck 20 to detect objects in the rear region C.

Figure 2:
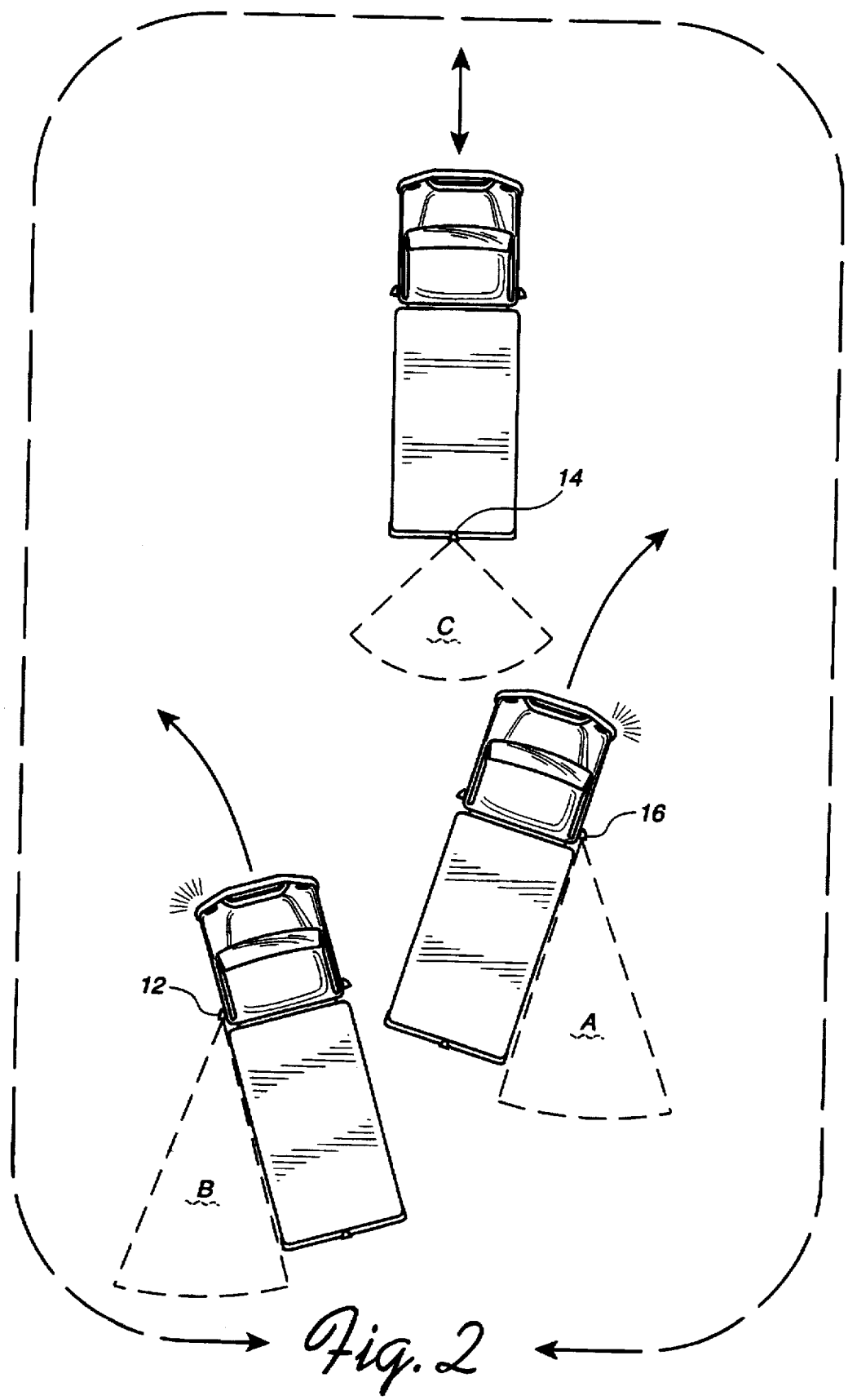
FIG. 2 shows video coverage regions of cameras installed on different locations of a vehicle.

FIG. 2 illustrates video coverage regions of the video cameras installed on the truck 20. When the truck 20 is moving either forward or backward, the observation of the region C is particularly useful since any objects immediately behind the truck is difficult to observe by the truck operator. When the truck 20 is making a right turn, the observation of the region A is useful to detect any fast moving traffic in the right hand lane. The use of the video camera 16 substantially eliminates any blind spots on the right side of the truck, thus reducing any danger caused by unsuspecting operator of the truck 20. When the truck 20 is making a left turn, the observation of the region B is useful for the similar reasons noted above with respect to the region A.

Figure 3:
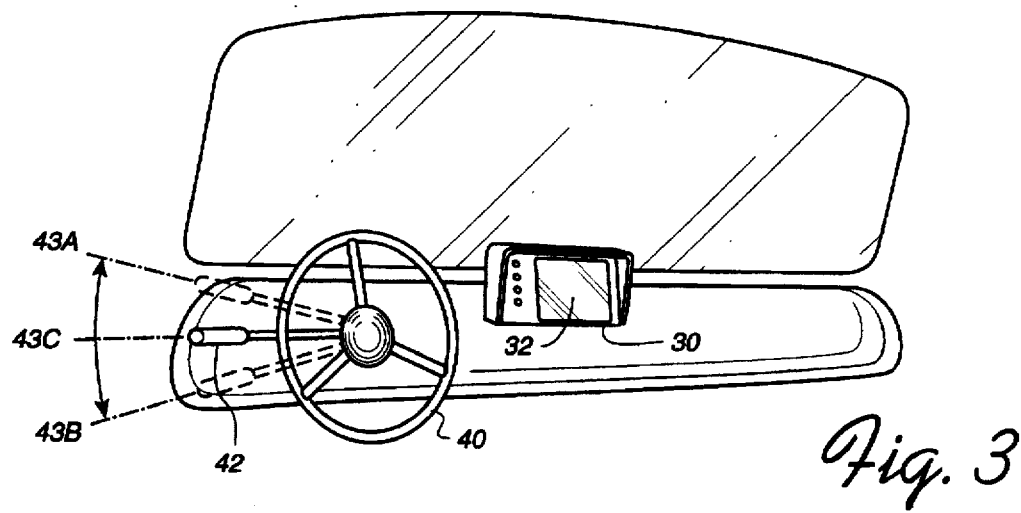
FIG. 3 is a perspective view of a dash board with a display device.

FIG. 3 is a dash board showing a turn signal control switch 42, main control unit 30 and a display apparatus 32 of the present invention. In a normal driving mode, where the turn signal control switch 42 is in its neutral position 43C (i.e., a middle position), the vehicle monitoring system 10 provides a video signal from the rear camera 14 to the main control unit 30 so that the operator of the vehicle can observe the objects behind the vehicle on the display apparatus 32. The view shown on the display apparatus 32 is substantially similar to the view obtained from a rear view mirror of a vehicle equipped with conventional mirrors. When the vehicle operator needs to make a right turn, the turn signal control switch 42 is put into an up position 43A. The up position of the turn signal control switch 42 enables a video signal from the right side camera 16 to be provided to the main control unit 30, so that the objects adjacent to the right side of the vehicle can be observed on the display apparatus 30. Similarly, when the turn signal control switch 42 is put into a down position 43B, a video signal from the left side camera 12 is provided to the main control unit 30.

Figure 4:
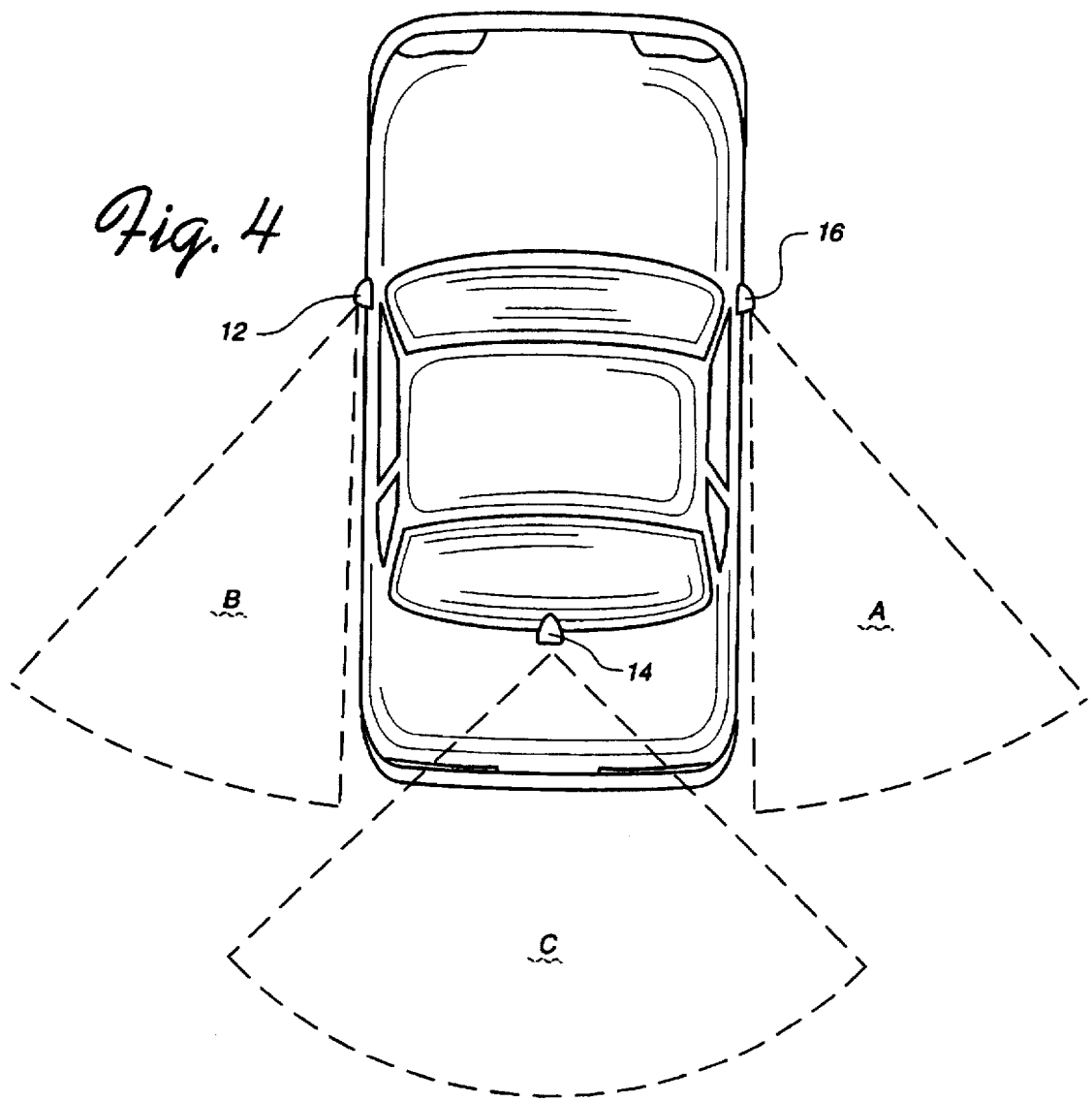
FIG. 4 is a top plan view of a vehicle monitoring system installed on a sedan.

FIG. 4 is a plan view of a vehicle monitoring system installed on a sedan. The mounting of three cameras are similar to that of the truck, namely a first camera on the left side of the vehicle, a second camera on the right side of the vehicle, and a third camera on the rear side of the vehicle. In particular, the third camera may be mounted inside and adjacent to the rear window or near a tail light.

Figure 5:
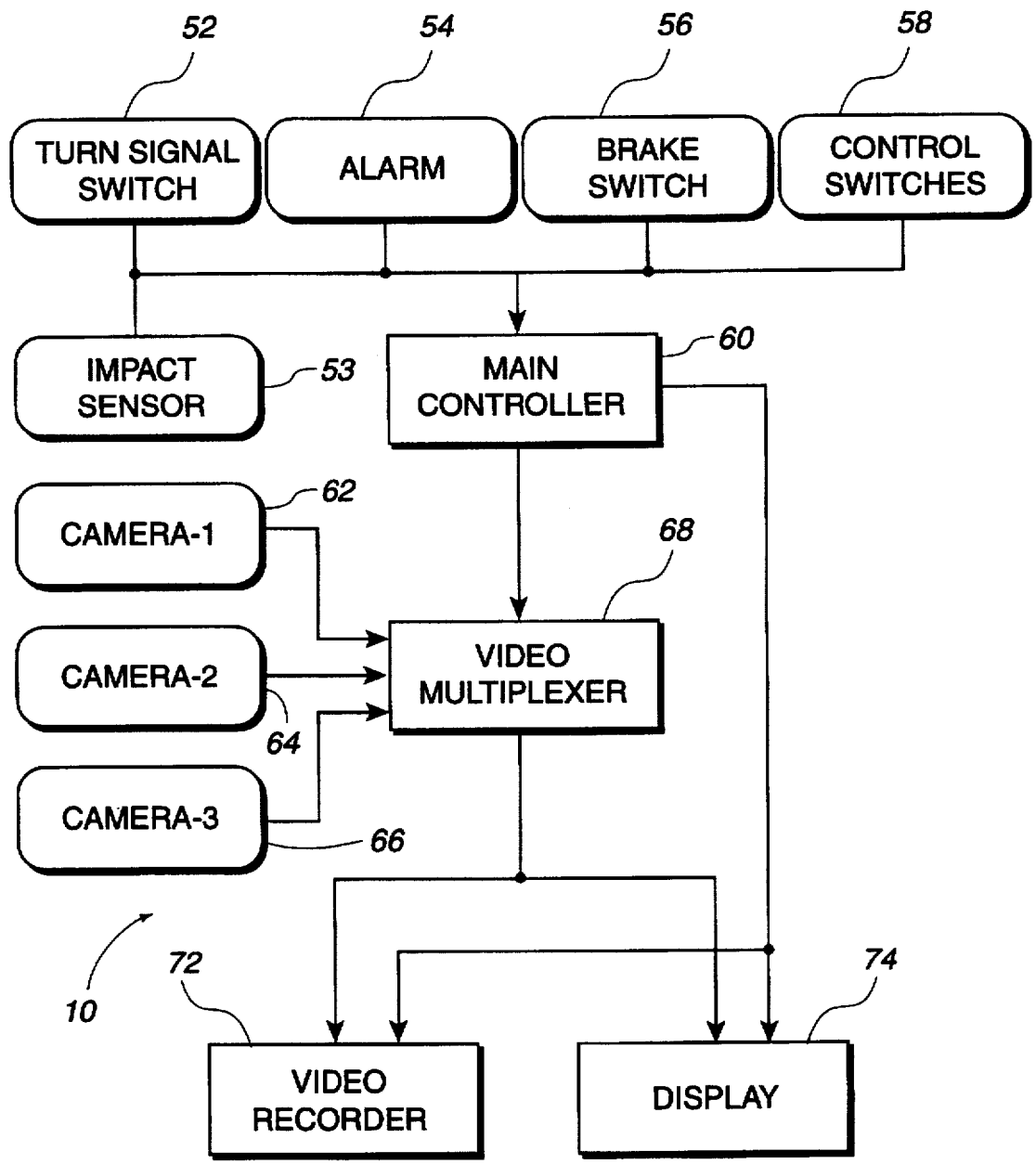
FIG. 5 is a block diagram of the preferred embodiment of the vehicle monitoring system.

FIG. 5 illustrates a functional block diagram of the vehicle monitoring system 10 according to the preferred embodiment of the present invention. The vehicle monitoring system 10 has a main controller 60, video cameras 62, 64 and 66, a video multiplexer 68, a display unit 74, a video recorder 72, and activation devices, such as a turn signal switch 52, an alarm 54, etc. The main controller 60 receives an activation signal from one of the activation devices. For example, as noted above with regard to FIG. 3, when a turn signal control switch 52 is activated, while the vehicle is in operation, by shifting the position to an up position 43A, the main controller 60 controls the video multiplexer 68 to feed a video signal from camera-1 62 to the display 74. Similarly, when the turn signal control switch 52 is shifted to a down position 43B, the main controller 60 controls the video multiplexer 68 to feed a video signal from camera-2 64 to the display 74. When the turn signal control switch 52 is at its neutral position 43C, a video signal from camera-3 is fed to the display 74 through the video multiplexer 68.

When an impact sensor 53, an alarm 54, or a brake switch 56 is activated, the main controller 60 preferably controls the video multiplexer 68 in such a way that the video signal from the camera-1 62, camera-2 64 and camera-3 66 are provided to the video recorder 72 in a time division manner. For example, the impact sensor 53, preferably installed on the rear bumper of the vehicle, is activated when the vehicle is hit from behind, in which the main controller 60 immediately turns on all of the cameras and the video recorder 72. In addition, the main controller 60, for example, controls the video multiplexer 68 to feed the video signal from each camera to the video recorder 72 for a period of 3 seconds, and switches to another camera for the same duration. This way, views from all three cameras are recorded in real time in the video recorder 72, which can be later used to determine who was at fault or who was involved in the accident.

Similarly, while the vehicle is unattended, an alarm installed in the vehicle might be triggered when an intruder tries to break into or tampers with the vehicle. In such instances, upon activation of the alarm, the main controllers 60 activates all of the cameras and controls the video multiplexer 68 to record video signals from each camera for a fixed period of time, for example, 3 seconds.

The impact sensor 53 may be of the type which is used to activate airbags installed in a vehicle. Only difference is that the impact sensor 53 for the preferred embodiment of the present invention is installed on a rear bumper of the vehicle rather than a front bumper. A similar sensor may be also installed on the side of the vehicle, for example, in a form of a body guard strip, to activate the vehicle monitoring system 10 when the vehicle is hit from the side.

The break switch 56 is designed to be activated when the vehicle is suddenly stopped to avoid a collision or the like. For example, the break switch 56 is activated when the break pedal is depressed with force. Preferably, the break switch may be installed underneath the break pedal in such a way that when the break pedal is depressed in a normal driving and stop condition, the break switch 56 is not triggered.

When the vehicle monitoring system 10 is in operation, the main controller 60 continuously monitors all of the buttons mounted on the front panel of the main controller 60 to determine whether they have been depressed. A processor module (not illustrated) in the main controller 60 advises the main controller 60 whenever a button is pressed or signals from various activation sensors are received. In the preferred embodiment, the processor module is a 386 microprocessor. However, any other suitable microprocessor could be used. The software to control the main controller 60 resides on either an EPROM or a Flash EPROM, or may be loaded into the main controller 60 from a mass storage device, such as a hard disk drive (not illustrated) or a floppy disk drive (not illustrated).

The main controller 60, which is connected to the video multiplexer 68 may include a display controller to control the video recorder 72 and the display 74. For example, an operator might desire that, while the vehicle is in operation, only the display 74 is activated when the turn signal control switch 52 is used, and that the video recorder 72 be activated only when the brake switch 56 or the impact sensor 53 is activated. Alternatively, when the vehicle is not in operation, the vehicle monitoring system 10 can be set up so that only the video recorder 72 is activated without the display 74.

The display 74 used with the vehicle monitoring system 10 is preferably about a 6 inch LCD display configured to display NTSC (National Television System Committee) video signals from a remote video camera. A preferred display is a Sharp LQ6NC02 TFT-LCD display, which has a small depth dimension for compact construction of the main control unit 30, as shown in FIG. 3, although any other suitable display may be utilized, such as a CRT. The display 74 preferably has a resolution sufficiently high to clearly display the views from surrounding regions of the vehicle.

Figure 6:
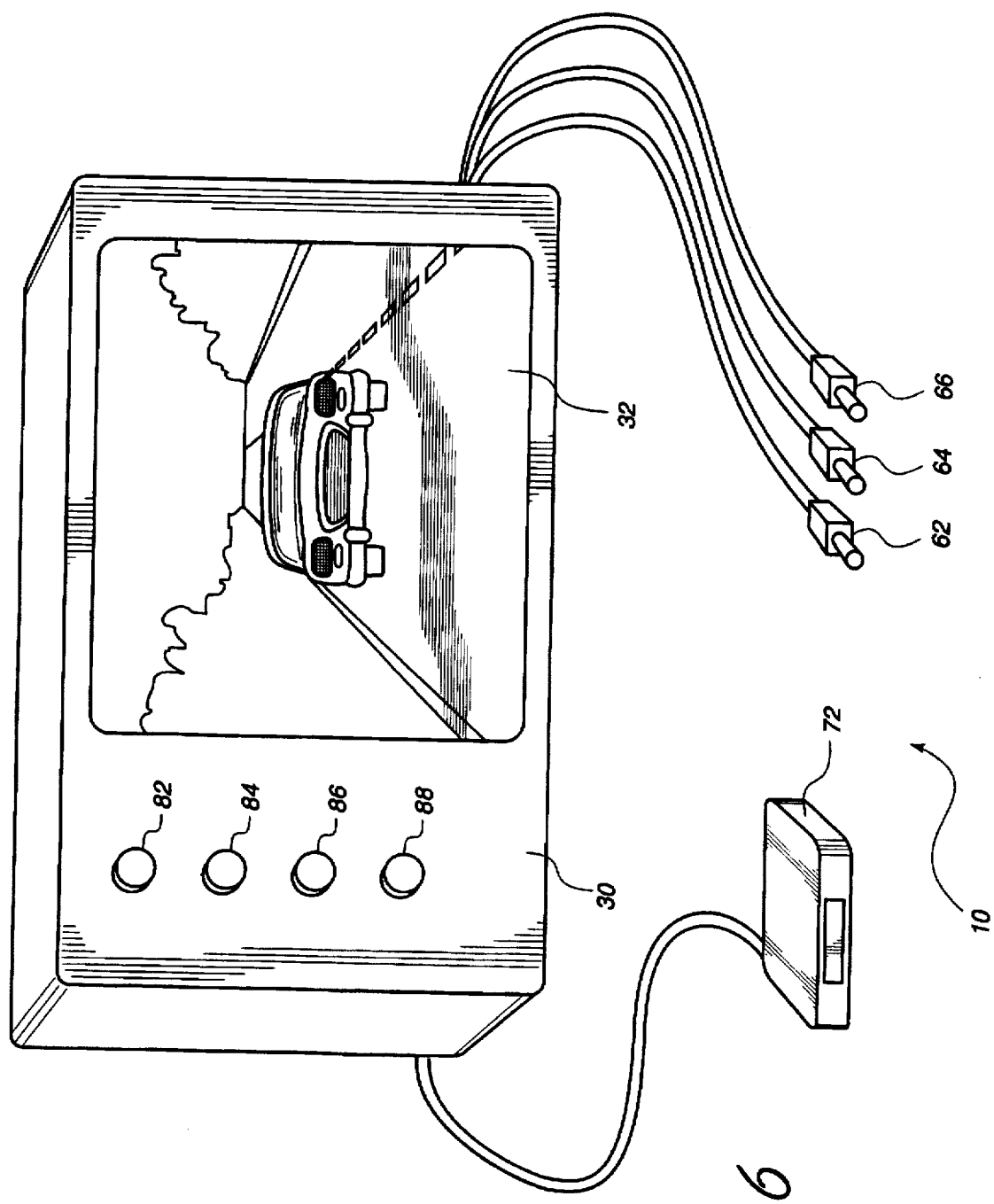
FIG. 6 shows a main control unit of the vehicle monitoring system showing a view from a camera.

FIG. 6 shows the main control unit 30 showing a view from a camera. The main control unit 30 has a plurality of control switches which are in the form of push button switches. The control switches are used to manually control the vehicle monitoring system 10. For example, a first switch 82 is a power switch for activating or deactivating the vehicle monitoring system 10. Once the vehicle monitoring system 10 is turned on, and the operator of the vehicle wishes to observe the views from different cameras, a second switch 84 may be depressed to select a different camera. In particular, when the second switch 84 is pressed once, the camera-1 62 is preferably selected. When the second switch 84 is pressed again, the camera-2 64 is preferably selected. Once all of the cameras have been selected, the camera-1 62 is selected again upon activation of the second button 84. A third switch 86 may be used to manually activate the video recorder 72, so that any views displayed on the display 74 is also recorded. A fourth switch 88 may be used to manually activate the scan mode of the vehicle monitoring system 10. In the scan mode, the views from the cameras installed on different locations of the vehicle are displayed and recorded one at a time for a fixed period of time, for example, 3 seconds. In alternative embodiments of the present invention, there may be other switches installed in the main control unit 30 to allow other functions. Furthermore, there may also be a remote control unit (not illustrated) connected to the main control unit for controlling the vehicle monitoring system 10 from, for example, a back seat of the vehicle.

As an alternative embodiment of the above described vehicle monitoring system a display touch screen and on screen menu may be implemented with the existing display and switches to select different viewing modes and functions. Moreover, the display of the main control unit 30 may display the views from at least two cameras. Such display may be incorporated as a picture-in-picture or a split screen format. Furthermore, each camera may be equipped with a zoom lens to provide a closer up view of the surrounding regions of the vehicle. Still further, the vehicle monitoring system may have more than three cameras to cover more regions, such as the front of the vehicle.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A monitoring system for use with a vehicle for detecting the presence of an object moving relative and adjacent to the vehicle, the monitoring system comprising:

a plurality of video cameras mounted on the vehicle, in which the plurality of video cameras are adapted to view surrounding regions of the vehicle;

an activation device for selecting for display at least one of the camera views of the surrounding regions of the vehicle, wherein the activation device is a brake sensor which is triggered when the vehicle makes a sudden stop; and a display apparatus for displaying at least one of the camera views in response to the activation device.

2. A monitoring system for use with a vehicle for detecting the presence of an object moving relative and adjacent to the vehicle, the monitoring system comprising:

a first video camera mounted on a right side of the vehicle to view an object present in the right region of the vehicle;

a second video camera mounted on a left side of the vehicle to view an object present in the left region of the vehicle;

a third video camera mounted on a rear the vehicle to view an object present in the rear region of the vehicle;

a turn signal control switch for selecting for display at least one of the camera view of the surrounding regions of the vehicle, wherein the camera view from the first video camera is selected when the turn signal control switch is enabled to represent a right turn, the camera view from the second video camera is selected when the turn signal switch is enabled to represent a left turn, and the camera view from the third video camera is selected when the turn signal control switch is at a neutral position; and a display apparatus for displaying the display selected by the turn signal control switch.

3. A monitoring system according to claim 2, further including a controller responsive to the turn signal control switch for selecting a video signal to be displayed on the display apparatus; and an activation device coupled to the controller.

4. A monitoring system according to claim 3, further including a video multiplexer responsive to a control signal generated from the controller, wherein the video multiplexer is coupled to the first, the second and the third video cameras to provide the video signal to the display apparatus.

5. A monitoring system according to claim 4, further including a video recording device coupled to the video multiplexer.

6. A monitoring system for use with a vehicle for detecting the presence of an object moving relative and adjacent to the vehicle, the monitoring system comprising:

a first video camera mounted on a right side of the vehicle to view an object present in the right region of the vehicle;

a second video camera mounted on a left side of the vehicle to view an object present in the left region of the vehicle;

a third video camera mounted on a rear the vehicle to view an object present in the rear region of the vehicle;

a turn signal control switch for selecting for display at least one of the camera view of the surrounding regions of the vehicle, wherein the camera view from the first video camera is selected when the turn signal control switch is enabled to represent a right turn, the camera view from the second video camera is selected when the turn signal switch is enabled to represent a left turn, and the camera view from the third video camera is selected when the turn signal control switch is at a neutral position;

a display apparatus for displaying the display selected by the turn signal control switch;

a controller responsive to the turn signal control switch for selecting a video signal to be displayed on the display apparatus;

a video multiplexer responsive to a control signal generated from the controller, wherein the video multiplexer is coupled to the first, the second and the third video cameras to provide the video signal to the display apparatus;

a video recording device coupled to the video multiplexer;

an activation device coupled to the controller, wherein the activation device includes a theft deterrent system equipped with a protection circuit and installed in the vehicle, which activates the controller when the protection circuit is disrupted, wherein the controller controls the video multiplexer to provide the video signal from each one of the video cameras in a sequential manner for a predetermined period to at least one of the video recording device and the display apparatus.

7. A monitoring system for use with a vehicle for detecting the presence of an object moving relative and adjacent to the vehicle, the monitoring system comprising:

a first video camera mounted on a right side of the vehicle to view an object present in the right region of the vehicle;

a second video camera mounted on a left side of the vehicle to view an object present in the left region of the vehicle;

a third video camera mounted on a rear the vehicle to view an object present in the rear region of the vehicle;

a turn signal control switch for selecting for display at least one of the camera view of the surrounding regions of the vehicle, wherein the camera view from the first video camera is selected when the turn signal control switch is enabled to represent a right turn, the camera view from the second video camera is selected when the turn signal switch is enabled to represent a left turn, and the camera view from the third video camera is selected when the turn signal control switch is at a neutral position;

a display apparatus for displaying the display selected by the turn signal control switch;

a controller responsive to the turn signal control switch for selecting a video signal to be displayed on the display apparatus;

a video multiplexer responsive to a control signal generated from the controller, wherein the video multiplexer is coupled to the first, the second and the third video cameras to provide the video signal to the display apparatus;

a video recording device coupled to the video multiplexer;

an activation device coupled to the controller, wherein the activation device includes an impact sensor mounted in the vehicle which activates the controller when the object collides with the vehicle, wherein the controller controls the video multiplexer to provide the video signal from each one of the video cameras in a sequential manner for a predetermined period to at least one of the video recording device and the display apparatus.

8. A monitoring system for use with a vehicle for detecting the presence of an object moving relative and adjacent to the vehicle, the monitoring system comprising:

a first video camera mounted on a right side of the vehicle to view an object present in the right region of the vehicle;

a second video camera mounted on a left side of the vehicle to view an object present in the left region of the vehicle;

a third video camera mounted on a rear the vehicle to view an object present in the rear region of the vehicle;

a turn signal control switch for selecting for display at least one of the camera view of the surrounding regions of the vehicle, wherein the camera view from the first video camera is selected when the turn signal control switch is enabled to represent a right turn, the camera view from the second video camera is selected when the turn signal switch is enabled to represent a left turn, and the camera view from the third video camera is selected when the turn signal control switch is at a neutral position;

a display apparatus for displaying the display selected by the turn signal control switch;

a controller responsive to the turn signal control switch for selecting a video signal to be displayed on the display apparatus;

a video multiplexer responsive to a control signal generated from the controller, wherein the video multiplexer is coupled to the first, the second and the third video cameras to provide the video signal to the display apparatus;

a video recording device coupled to the video multiplexer;

an activation device coupled to the controller, wherein the activation device includes a brake sensor which activates the controller when the vehicle makes a sudden stop, wherein the controller controls the video multiplexer to provide the video signal from each one of the video cameras in a sequential manner for a predetermined period to at least one of the video recording device and the display apparatus.

* * * * *